PROCESS OF USING A CUSHION FOR LAMINATING OPERATIONS

This is a continuation, of application Ser. No. 96,584, filed Nov. 21, 1979 and now Pat. No. 4,264,404.

BACKGROUND OF THE INVENTION

Laminates have been employed as surface materials for application to tables, vanities, vertical wall coverings, door coverings, and the like for a number of years. Conventionally, these laminates are prepared by assembling, in superimposed relationship, a core layer which consists of a plurality of kraft paper sheets impregnated with a thermosetting phenol-formaldehyde resin and a decorative sheet that is impregnated with a thermosetting resin which does not undergo noticeable deterioration in color, such as darkening, upon any subsequent laminating operations. Typical resins used in the decorative sheet include, but are not limited to, melamine-formaldehyde resins, epoxy resins, unsaturated polyester resins, and urea resins. The decorative sheet itself is conventionally an alpha-cellulose paper sheet which has been dyed, pigmented or upon which there is imparted some design or pattern. Frequently, superimposed above the decorative sheet there is placed an overlay sheet. The overlay sheet is a highly refined alpha-cellulose paper sheet unpigmented, but impregnated with a color-stable thermosetting resin.

The assembled laminate is heat and pressure consolidated under conventional conditions of pressure and temperature to produce a unitary laminated product. During heat and pressure consolidation, the arrangement of plates, cushions, sheets and the laminate assembly must be such so as to most effectively and uniformly distribute the heat and pressure to the laminate. The cushion in such an arrangement acts to absorb thermal shock and shear stress during pressing thereby aiding the uniform distribution of heat and pressure to the laminate. The cushion employed in this arrangement has traditionally been comprised of a plurality of unimpregnated kraft paper sheets. Cushions of this type at the top of the press pack have an average useful life of 5 pressing runs. When employed at the bottom of the press pack, their useful life has an upper limit of approximately 25 pressing runs. When used at the top of the press pack, their useful life is somewhat shorter due to excessive handling because, after each run, they are inspected for damage. If no damage is discovered, the top-used cushions are either used again as the top cushion or reshuffled into the bottom of the press pack. Because of this, the cost of cushions to the laminating industry is presently approaching three million dollars annually and escalating. Additionally, the conventional kraft cushions currently employed oftimes result in a peripheral gloss around the edges of the laminate, called the picture frame effect, requiring the edges to be trimmed off of the laminates so produced before they are sold. This additional trimming step contributes to the cost of laminate manufacture especially when a paper texturizer has been employed. Occasionally, water marks will also result from the use of these conventional cushions in that the uniformity of the heat and pressure fluctuates when they have been used a number of times.

Thus, there exists the need for a cushion that exhibits a greater useful life and yet continues to effectively and uniformly distribute heat and pressure to the decorative laminate assembly. Accordingly, the provision for a more economical and efficient cushion would fulfill a long-felt need and constitute a significant advance in the art.

SUMMARY OF THE INVENTION

The present invention provides for a novel cushion for use in laminating operations and a process of producing a laminate wherein such a cushion is employed. The cushion enables a uniform distribution of heat and pressure to the laminate, eliminates the peripheral gloss and water markings of the laminates prepared, and has a useful life of over 100 pressings. Surprisingly, the instant cushion also aids in the elimination of flash, dirt and foreign particles which are attracted to the thermoplastic material and are transferred during subsequent pressings to the laminate. The cushion is easily handleable and provides for a cost reduction of up to about 80% over the conventional cushions.

DETAILED DESCRIPTION OF THE INVENTION

In accordance with the instant invention, there is provided a laminating cushion comprising at least two cellulosic paper sheets and at least one thermoplastic sheet having a glass transition point below about 100° C. and a melting point of about 125° C. or more wherein the thermoplastic sheets have an individual thickness ranging from about 2 to 20 mils and a combined thickness greater than 5 mils and wherein the individual thermoplastic sheets are interleaved between the cellulosic paper sheets. Additionally, there is provided a process for producing a laminate comprising placing an assembly comprising, in superimposed relationship, (1) a caul plate of a laminate press, (2) a cushion, (3) a release sheet, (4) a thermosetting resin impregnated laminate assembly and (5) a press plate within a laminate assembly press and thereafter effecting consolidation of the laminate assembly by applying sufficient heat and pressure to thermoset the resins impregnating the laminate assembly wherein the cushion employed comprises at least two cellulosic paper sheets and at least one thermoplastic sheet wherein the thermoplastic sheets have an individual thickness ranging from about 2 to 20 mils and a combined thickness greater than about 5 mils and wherein the individual thermoplastic sheets are interleaved between the cellulosic paper sheets.

Suitable cellulosic paper sheets include, but are not limited to, cellulosic paper sheets prepared from kraft, acid sulfite, oxygen, soda and neutral sulfite pulping processes. Preferably, they are of the type conventionally employed in laminate cushions, i.e., a kraft paper sheet of about a 30 to 130 pound basis weight per 3000 square foot ream available commercially in plentiful supply, but may also include alpha-cellulose sheets and especially those alpha-cellulose sheets which were formed into decor sheets but are not employed as such because the decorative design thereon becomes obsolete.

Suitable thermoplastic material includes sheets of polypropylene, polycarbonate, polystyrene and the like. These thermoplastic sheets exhibit a glass transition point below about 100° C. and a melting point of about 125° C. or more. These thermoplastic sheets should have a thickness of about 2 to 20 mils. The preferred mode of the instant invention is to employ 3 or more thermoplastic sheets within the cushion with each individual sheet having a thickness of from about 3 to 10

United States Patent [19]

Giesler

[11] 4,340,439

[45] * Jul. 20, 1982

[54] PROCESS OF USING A CUSHION FOR LAMINATING OPERATIONS

[75] Inventor: Harold C. Giesler, Westchester, Ohio

[73] Assignee: Formica Corporation, Wayne, N.J.

[ * ] Notice: The portion of the term of this patent subsequent to Apr. 28, 1998, has been disclaimed.

[21] Appl. No.: 233,276

[22] Filed: Feb. 10, 1981

Related U.S. Application Data

[63] Continuation of Ser. No. 96,584, Nov. 21, 1979, Pat. No. 4,264,404.

[51] Int. Cl.[3] .............................................. B32B 31/20

[52] U.S. Cl. .................................... 156/323; 156/289; 156/537; 428/214; 428/339; 428/412; 428/513

[58] Field of Search ................................ 100/295–297; 156/288, 289, 323, 334, 537; 428/153, 154, 213, 214, 314, 339, 412, 512, 513, 523

[56] References Cited

U.S. PATENT DOCUMENTS

| | | | |
|---|---|---|---|
| 3,297,515 | 1/1967 | Regenstein et al. | 428/512 |
| 3,536,563 | 10/1970 | Brandts et al. | 428/153 X |
| 3,684,613 | 8/1972 | Frohning | 156/323 X |
| 3,701,706 | 10/1972 | Giddings et al. | 428/503 X |
| 3,723,220 | 3/1973 | Scher et al. | 156/323 X |
| 3,997,696 | 12/1976 | Jaisle et al. | 156/323 X |
| 4,264,404 | 4/1981 | Giesler | 156/537 |

*Primary Examiner*—Edward C. Kimlin
*Assistant Examiner*—Robert A. Dawson
*Attorney, Agent, or Firm*—Paul W. Leuzzi, II

[57] ABSTRACT

Cellulosic paper sheets interleaved with sheets of a thermoplastic material having a glass transition point below about 100° C. and a melting point of about 125° C. or more provide a cushion for use in laminating operations. The thermoplastic sheets employed in the cushion have an individual thickness ranging from about 2 to 20 mils and a combined thickness of at least 5 mils. Such a cushion provides a long-term, reuseable cushion for laminating operations.

1 Claim, No Drawings

EXAMPLE 4

When the procedure of Example 3 is followed in a series of laminations employing the same cushions, results substantially equivalent to Example 2 are obtained.

EXAMPLE 5

When the procedure of Example 1 is followed in every material detail except that there is employed as the top and bottom cushion a cushion comprising eight kraft paper sheets with seven polypropylene sheets each individually 4 mils in thickness interleaved between the kraft paper sheets substantially equivalent results are obtained to those reported in Example 1.

EXAMPLE 6

When a series of laminations employing the cushions of Example 5 are run, results substantially equivalent to Example 2 are obtained.

EXAMPLE 7

When the procedure of Example 1 is followed in every material detail except that there is employed as the top and bottom cushion a cushion comprising two acid sulfite paper sheets with one 10-mil polycarbonate sheet interleaved between the paper sheets substantially equivalent results are obtained to those reported in Example 1.

EXAMPLE 8

When a series of laminations employing the cushions of Example 7 are run, results substantially equivalent to Example 2 are obtained.

EXAMPLE 9

When the procedure of Example 1 is followed in every material detail except that there is employed as the top and bottom cushions a cushion comprising four obsolete alpha-cellulose decor paper sheets with three 4-mil polypropylene sheets interleaved between the obsolete alpha-cellulose decor paper sheets, substantially equivalent results are obtained to those reported in Example 1.

EXAMPLE 10

When the procedure of Example 1 is followed in every material detail except that there is employed as the top and bottom cushions a cushion comprising six kraft paper sheets with five 5-mil polystyrene sheets interleaved between the kraft paper sheets, substantially equivalent results are obtained to those reported in Example 1.

What is claimed is:

1. A process for producing a heat and pressure consolidated laminate which comprises heat and pressure consolidating a laminate assembly while employing, as a pressure cushion, at least two cellulosic sheets and at least one thermoplastic sheet having a glass transition point below 100° C. and a melting point of about 125° C. or more wherein the thermoplastic sheet or sheets have an individual thickness ranging from about 2 to 20 mils and a combined thickness greater than about 5 mils and wherein the individual thermoplastic sheets are interleaved between the cellulosic paper sheets.

* * * * *